US008967198B2

(12) United States Patent
Takahashi (10) Patent No.: US 8,967,198 B2
(45) Date of Patent: Mar. 3, 2015

(54) OIL STORING DEVICE AND ENGINE HAVING THE SAME

(75) Inventor: Hiroshi Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 448 days.

(21) Appl. No.: 13/069,455

(22) Filed: Mar. 23, 2011

(65) Prior Publication Data

US 2011/0232785 A1    Sep. 29, 2011

(30) Foreign Application Priority Data

Mar. 26, 2010    (JP) .................. 2010-073445

(51) Int. Cl.
| | | |
|---|---|---|
| F03B 11/02 | (2006.01) | |
| F01M 11/04 | (2006.01) | |
| F01M 11/00 | (2006.01) | |
| F01M 11/03 | (2006.01) | |
| F16L 29/02 | (2006.01) | |
| F16L 39/00 | (2006.01) | |
| F16N 21/00 | (2006.01) | |

(52) U.S. Cl.
CPC ........... *F01M 11/04* (2013.01); *F01M 11/0004* (2013.01); *F01M 11/03* (2013.01); *F16L 29/02* (2013.01); *F16L 39/00* (2013.01); *F16N 21/00* (2013.01); *F01M 2011/0025* (2013.01); *F01M 2011/0029* (2013.01); *F01M 2011/0054* (2013.01)
USPC ............... 137/561 R; 123/196 R; 123/196 A; 123/195 C; 184/29; 184/32; 184/36; 184/48.1; 184/75; 251/149.6

(58) Field of Classification Search
USPC ........ 137/561 R, 588, 243.2; 123/48 A, 48 R, 123/78 A, 78 R, 311, 196 R, 196 A, 195 C; 184/14, 14.1, 39, 41, 42, 45.1, 45.2, 184/75, 29, 32, 36, 48.1, 80, 91, 95; 251/149.6, 144, 149.1, 149.7
See application file for complete search history.

(56) References Cited

U.S. PATENT DOCUMENTS

| | | | | |
|---|---|---|---|---|
| 1,769,897 A | * | 7/1930 | Hans .......................... | 123/196 A |
| 4,903,654 A | | 2/1990 | Sato et al. | |
| 5,130,014 A | * | 7/1992 | Volz .............................. | 210/130 |
| 5,353,837 A | | 10/1994 | Faust | |
| 5,515,712 A | * | 5/1996 | Yunick ................................ | 73/9 |
| 6,330,869 B1 | * | 12/2001 | Yoshiki et al. ............. | 123/90.15 |
| 7,188,697 B2 | * | 3/2007 | Ito et al. ......................... | 180/293 |
| 7,261,079 B2 | | 8/2007 | Gunji et al. | |

FOREIGN PATENT DOCUMENTS

| | | |
|---|---|---|
| JP | 3-92495 A | 4/1991 |
| JP | 4-153513 A | 5/1992 |

(Continued)

*Primary Examiner* — Hung Q Nguyen
*Assistant Examiner* — Ruben Picon-Feliciano
(74) *Attorney, Agent, or Firm* — Birch, Stewart, Kolasch & Birch, LLP (57) ABSTRACT

An oil storing device includes a body portion. The body portion is formed at its one end with an engaging portion having an oil supply port for supplying engine oil and an oil return port for introducing the engine oil. The engaging portion is detachably connected to a connecting portion of a crankcase. Oil storing chambers for storing the engine oil are formed in the body portion so as to be connected to the oil supply port and the oil return port. When the engaging portion is engaged with the connecting portion of the crankcase, the oil supply port is connected to an inlet port leading to an oil pump, and the oil return port is connected to an outlet port to the crankcase.

15 Claims, 10 Drawing Sheets

(56) References Cited

FOREIGN PATENT DOCUMENTS

| | | |
|---|---|---|
| JP | 6-323118 A | 11/1994 |
| JP | 10-252439 A | 9/1998 |
| JP | 2000-328921 A | 11/2000 |
| JP | 2006-183516 A | 7/2006 |

* cited by examiner

OIL STORING DEVICE AND ENGINE HAVING THE SAME

CROSS-REFERENCE TO RELATED APPLICATIONS

The present application claims priority under 35 USC 119 to Japanese Patent Application No. 2010-073445 filed on Mar. 26, 2010 the entire contents of which are hereby incorporated by reference.

BACKGROUND OF THE INVENTION

1. Field of the Invention

The present invention relates to a storing structure for oil for lubrication of engine parts. More particularly, to an oil storing device suitable for oil drainage and an engine having the oil storing device.

2. Description of Background Art

In a crankcase structure of an engine to be mounted on a vehicle such as an automobile is known wherein an oil pan for storing engine oil is located below a crankshaft. The engine oil stored in the oil pan is supplied to a crankshaft system and a cam system to lubricate the required sliding parts. Thereafter, the oil is next circulated to be returned to the oil pan. See, for example, Japanese Patent Laid-open No. 2006-183516.

Usually, the height of the crankshaft, the capacity of the oil pan, the amount of engine oil, etc. are suitably set so that the oil level of the engine oil in the oil pan is lower than the lowermost end of a locus of rotation of the crankshaft system.

In Japanese Patent Laid-open No. 2000-328921, a dry sump lubrication device for an engine is described with a dedicated oil tank. In this dry sump lubrication device, the oil tank is connected through any means such as a pipe to a lower portion of the engine. A dedicated drain bolt is provided at the lower portion of the engine, and the oil tank is also provided with a drain bolt. In supplying oil into the engine, the oil is directly poured into the oil tank.

In the structure disclosed in Japanese Patent Laid-open No. 2006-183516, the dedicated oil pan must be provided and it has a structure of almost covering the lower portion of the engine. In draining the oil, an oil receptacle is preliminarily set below a dedicated drain bolt, and the drain bolt is next removed. In this oil draining operation, a special tool for removing the drain bolt is required and attention must be paid so as not to drop the drain bolt into the oil receptacle. Thus, this oil draining operation is troublesome. Naturally, a work space for this operation is required and waste oil disposal after draining the oil is also required. Further, in this oil draining operation, the work space, the engine itself, and the operator are soiled with the oil in most cases.

Further, an oil filler port must be provided separately as is well known in the art. More specifically, from the viewpoint of the engine structure, the oil filler port is separate from an oil drain port, and it is presently impossible to eliminate these ports and thereby reduce the number of parts detachably mounted to the engine.

In the structure disclosed in Japanese Patent Laid-open No. 2000-328921, the position of an oil pan can be changed by adopting the dry sump lubrication. Accordingly, as compared with the structure disclosed in Japanese Patent Laid-open No. 2006-183516, the workability in the oil draining operation appears to be improved. However, the number of man-hours of the oil draining operation in the structure disclosed in Japanese Patent Laid-open No. 2000-328921 is the same as that in the structure disclosed in Japanese Patent Laid-open No. 2006-183516. More specifically, a special tool is required in draining the oil. Further, any work space accepted to be soiled with the oil is required and the problem that the operator is soiled with the oil still remains.

SUMMARY AND OBJECTS OF THE INVENTION

It is accordingly an object of an embodiment of the present invention to provide an oil storing device which can make the oil draining operation very simple and can eliminate the problem of oil soiling and also to provide an engine having this oil storing device.

In accordance with the an embodiment of the present invention, there is provided an oil storing device having a body portion, wherein the body portion is formed at its one end with an engaging portion having an oil supply port for supplying engine oil to an engine and an oil return port for introducing the engine oil from the engine, the engaging portion is adapted to be detachably connected to a connecting portion of a crankcase. An oil storing chamber for storing the engine oil is formed in the body portion so as to be connected to the oil supply port and the oil return port. When the engaging portion is engaged with the connecting portion of the crankcase, the oil supply port is connected to an inlet port leading to an oil pump, and the oil return port is connected to an outlet port of an engine oil from the crankcase.

According to an embodiment of the present invention, the engaging portion is provided with closing means for closing the oil supply port and the oil return port, so that the oil storing chamber can be enclosed.

According to an embodiment of the present invention, the closing means includes a piston member for closing a communication hole to which the oil supply port and the oil return port open, a seal member for sealing the outer circumference of the piston member, and a spring member for biasing the piston member to a closed position of the communication hole. When the piston member is pushed against a biasing force of the spring member, the communication hole is opened.

According to an embodiment of the present invention, an engine oil is preliminarily sealed in the oil storing chamber.

According to an embodiment of the present invention, the piston member is provided with a grip for use in pulling the piston member out of the engaging portion.

According to an embodiment of the present invention, the oil storing chamber is formed with an opening portion adapted to communicate with the outside of the oil storing chamber.

According to an embodiment of the present invention, an oil filter is mounted to the opening portion so as to communicate with the oil storing chamber.

According to an embodiment of the present invention, a cap is mounted to the opening portion so as to communicate with the oil storing chamber.

According to an embodiment of the present invention, a cooling fin is formed on the outer surface of the body portion.

According to an embodiment of the present invention, the body portion is provided with an inspection window for visual inspection of an oil level in the body portion.

According to an embodiment of the present invention, a fastening member for maintaining an engaged condition of the connecting portion and the engaging portion is provided at one end of the body portion.

According to an embodiment of the present invention, there is provided an engine having the oil storing device.

According to an embodiment of the present invention, the connecting portion is provided at a lower portion of the crankcase, and the inlet port connected to the oil supply port is formed integrally with the outlet port connected to the oil return port.

According to an embodiment of the present invention, the connecting portion projects downwardly from a lowermost portion of the crankcase, and the oil storing device is mounted on the crankcase so that the oil storing chamber is located below the crankcase.

According to an embodiment of the present invention, when the engaging portion is engaged with the connecting portion, the piston member is pushed by the connecting portion against the biasing force of the spring member into the oil storing device, so that the oil supply port is connected to the inlet port and the oil return port is connected to the outlet port of the engine oil from the crankcase.

According to an embodiment of the present invention, when the engaging portion of the oil storing device is engaged with the connecting portion of the crankcase, the oil supply port is connected to the inlet port leading to the oil pump, and the oil return port is connected to the outlet port leading to the bottom surface of the crankcase. Accordingly, by demounting the oil storing device from the engine, the engine oil stored in the oil storing device can be discarded at a time, so that the oil changing operation can be performed cleanly and easily.

According to an embodiment of the present invention, the engaging portion is provided with the closing means for closing the oil supply port and the oil return port. Accordingly, the oil storing chamber is enclosed before the oil storing device is mounted to the engine, so that the entry of dust into the oil storing chamber can be prevented. Further, engine oil can be sealed in the oil storing chamber.

According to an embodiment of the present invention, the closing means includes the piston member for closing the communication hole to which the oil supply port and the oil return port open, the seal member for sealing the outer circumference of the piston member, and the spring member for biasing the piston member to the closed position of the communication hole. When the piston member is pushed against the biasing force of the spring member, the communication hole is opened. Accordingly, the oil storing device is enclosed before the oil storing device is mounted to the engine, so that the entry of dust into the oil storing chamber can be prevented. Further, by forming the connecting portion of the engine into a projecting shape fitted to the engaging portion, the oil storing device can be mounted to the engine by a simple operation. Further, engine oil can be preliminarily sealed in the oil storing chamber.

According to an embodiment of the present invention, engine oil is preliminarily sealed in the oil storing chamber. Accordingly, an oil change can be made by simply replacing the oil storing device by a new one.

According to an embodiment of the present invention, the piston member is provided with the grip for use in pulling the piston member out of the engaging portion. Accordingly, the piston member can be easily removed in the case of recycling the oil storing device, so that the spent engine oil can be easily discarded.

According to an embodiment of the present invention, the oil passage connected to the oil supply port and the oil return port is formed with the opening portion adapted to communicate with the outside of the oil storing chamber. Accordingly, in the case of recycling the oil storing device, the spent engine oil can be easily discarded and the inside of the oil storing device can be easily cleaned.

According to an embodiment of the present invention, the oil filter is mounted to the opening portion so as to communicate with the oil passage connected to the oil supply port and the oil return port. Accordingly, the oil filter can be replaced at the time of replacement of the oil storing device.

According to an embodiment of the present invention, the cap is mounted to the opening portion so as to communicate with the oil storing chamber. Accordingly, in the case of recycling the oil storing device, the cap may be removed, so that the spent engine oil can be easily discarded and the inside of the oil storing device can be easily cleaned.

According to an embodiment of the present invention, the cooling fin is formed on the outer surface of the body portion. Accordingly, the cooling performance for the engine oil can be improved.

According to an embodiment of the present invention, the body portion is provided with the inspection window for visual inspection of an oil level of the oil storing chamber in the body portion. Accordingly, in demounting the oil storing device from the engine, the level of the engine oil stored in the oil storing chamber can be checked at a glance, and the timing of removal of the oil storing device can be determined. More specifically, the oil level checked through the inspection window may be compared with the predetermined oil level. Accordingly, even when the oil storing device is demounted from the engine, spilling of the oil from the engine can be avoided to thereby ensure a clean operation.

According to an embodiment of the present invention, the fastening member for maintaining the engaged condition of the connecting portion of the crankcase and the engaging portion is provided at one end of the body portion. Accordingly, the oil storing device can be mounted to the engine easily and tightly without the need for any special tool.

According to an embodiment of the present invention, the engine has the oil storing device.

According to an embodiment of the present invention, the connecting portion is provided at a lower portion of the crankcase, and the inlet port connected to the oil supply port and the outlet port are formed integrally with each other in the connecting portion. Accordingly, an oil inlet structure and an oil outlet structure can be formed collectively at one position, so that the oil storing device can be mounted and demounted at one position. As a result, the number of parts such as screws in the engine can be reduced.

According to an embodiment of the present invention, the connecting portion projects downward from a lowermost portion of the crankcase, and the oil storing device is mounted on the crankcase so that the oil storing chamber is located below the crankcase. Accordingly, the oil storing chamber as an oil reservoir is located below the lowermost portion of the engine, so that an oil reservoir capable of maintaining engine performance can be formed and the engine oil can be reliably drained from the engine.

According to an embodiment of the present invention, when the engaging portion of the oil storing device is engaged with the connecting portion of the engine, the piston member is pushed by the connecting portion against the biasing force of the spring member, so that the oil supply port is connected to the inlet port of the crankcase and the oil return port is connected to the outlet port of the crankcase. Accordingly, the oil storing device can be easily mounted to the engine by a very simple push operation. In the case wherein the engine oil is preliminarily sealed in the oil storing chamber, the oil change can also be completed by this simple operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the present invention will now be described.

A first preferred embodiment of the present invention will now be described in detail with reference to FIGS. 1 to 7.

In this preferred embodiment, the present invention is applied to a motorcycle such as a saddle seat type vehicle.

Figure 1:
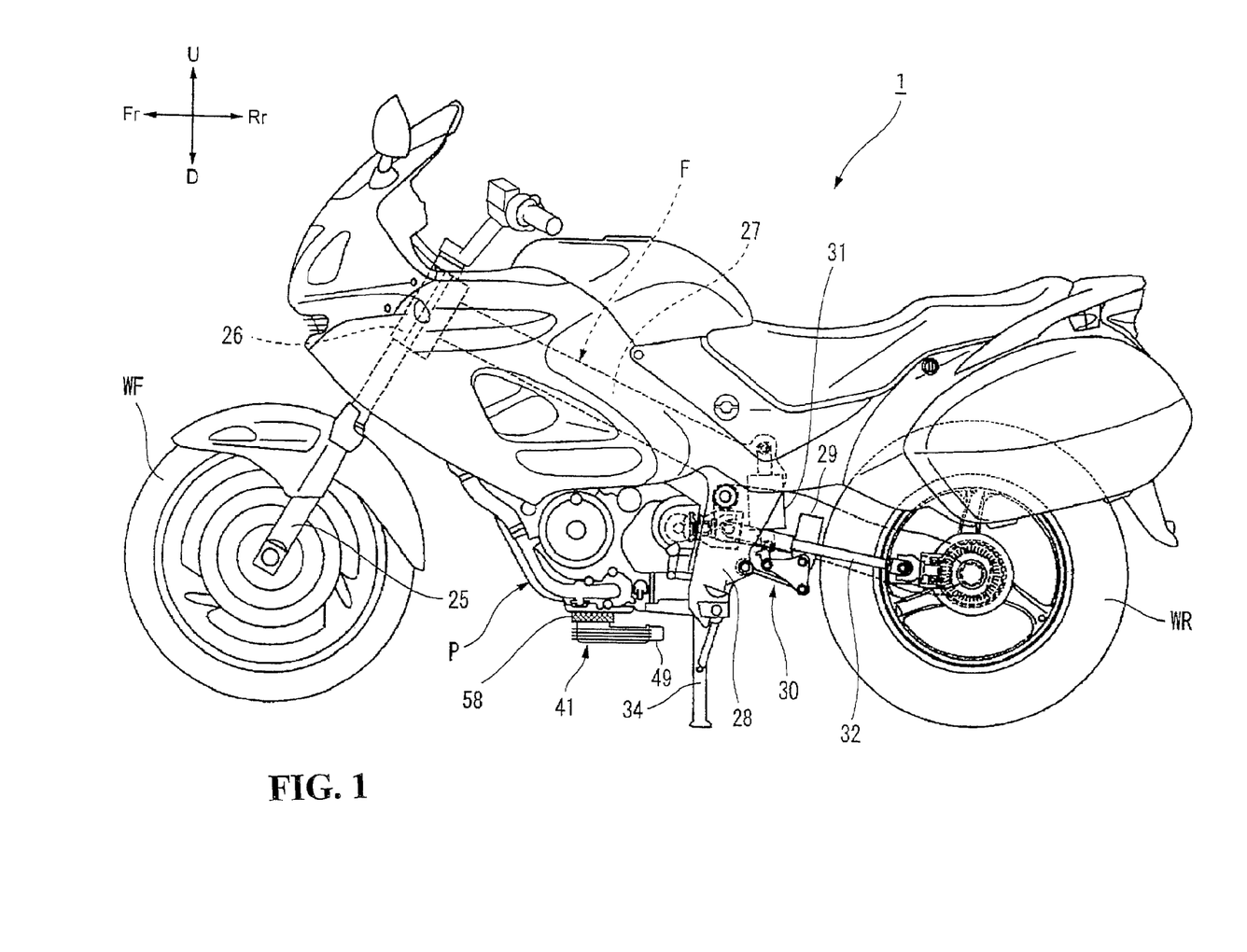
FIG. 1 is a left side view of a motorcycle in a first preferred embodiment of the present invention.

The general configuration of the motorcycle to which the present invention is applied will now be described in brief. Referring to FIG. 1, there is shown a motorcycle 1 in side elevation. The motorcycle 1 has a body frame F. The body frame F includes a head pipe 26 for steerably supporting a front fork 25 for supporting a front wheel WF, a pair of right and left main frames 27 extending rearwardly from the head pipe 26 so as to be inclined downwardly, and a pair of right and left pivot plates 28 extending downwardly from the rear portions of the right and left main frames 27. A swing arm 29 is pivotably supported at its front end to the pivot plates 28, and a rear wheel WR is supported to the rear portion of the swing arm 29. A link 30 is provided between the lower portions of the pivot plates 28 and the front portion of the swing arm 29. A shock absorber 31 is provided between the upper portions of the pivot plates 28 and the link 30.

A power unit P is mounted to the main frames 27 and the pivot plates 28. A rotating power output from the power unit P is transmitted through a drive shaft 32 extending in the longitudinal direction of the vehicle to the rear wheel WR.

Figure 2:
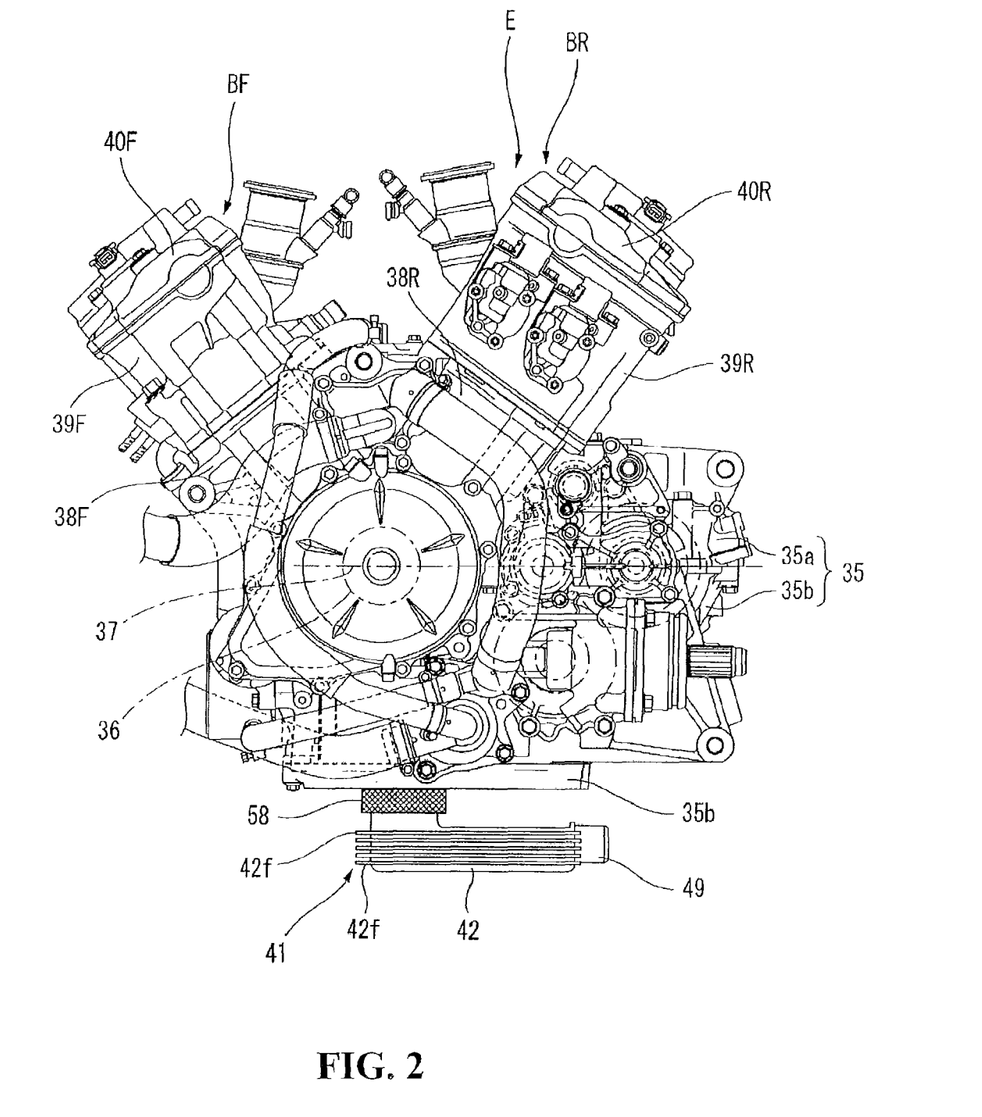
FIG. 2 is a left side view of a power unit in the motorcycle shown in FIG. 1.

The power unit P includes an engine E (see FIG. 2). A side stand 34 is mounted to an engine body of the engine E or to the body frame F. In this preferred embodiment, the side stand 34 is mounted to the lower portion of the left pivot plate 28 of the body frame F. Accordingly, when the side stand 34 is operated to park the motorcycle 1, the motorcycle 1 is inclined to the left side. In FIG. 1, symbols Fr, Rr, U, and D denote the front, rear, upper, and lower sides of the vehicle, respectively.

Referring to FIG. 2, there is shown an engine E in a side elevation. The engine E is a V-type water-cooled engine with an engine body having a front bank BF located on the front side in a condition wherein the engine E is mounted on the motorcycle 1 and a rear bank BR located on the rear side of the front bank BF. The engine body of the engine E has a crankcase 35 commonly provided for the front and rear banks BF and BR. A crankshaft 36 is rotatably supported to the crankcase 35 so as to extend in the lateral direction of the motorcycle 1.

The crankcase 35 is composed of an upper case half 35a and a lower case half 35b joined together. The upper case half 35a is integrally formed with a front cylinder block 38F and a rear cylinder block 38R, these cylinder blocks 38F and 38R forming a V shape as viewed in side elevation. The axis of the crankshaft 36 lies on a joined surface 37 between the upper case half 35a and the lower case half 35b.

The front bank BF is generally composed of the front cylinder block 38F mentioned above, a front cylinder head 39F joined to the front cylinder block 38F, and a front head cover 40F joined to the front cylinder head 39F. Similarly, the rear bank BR is generally composed of the rear cylinder block 38R mentioned above, a rear cylinder head 39R joined to the rear cylinder block 38R, and a rear head cover 40R joined to the rear cylinder head 39R. An oil storing device 41 is connected to the lower portion of the crankcase 35.

As mentioned above, the lower portion of the crankcase 35 of the engine E is provided with the oil storing device 41. The structure of the oil storing device 41 and the structure of a mounting portion of the engine E for mounting the oil storing device 41 will now be described.

Figure 3:
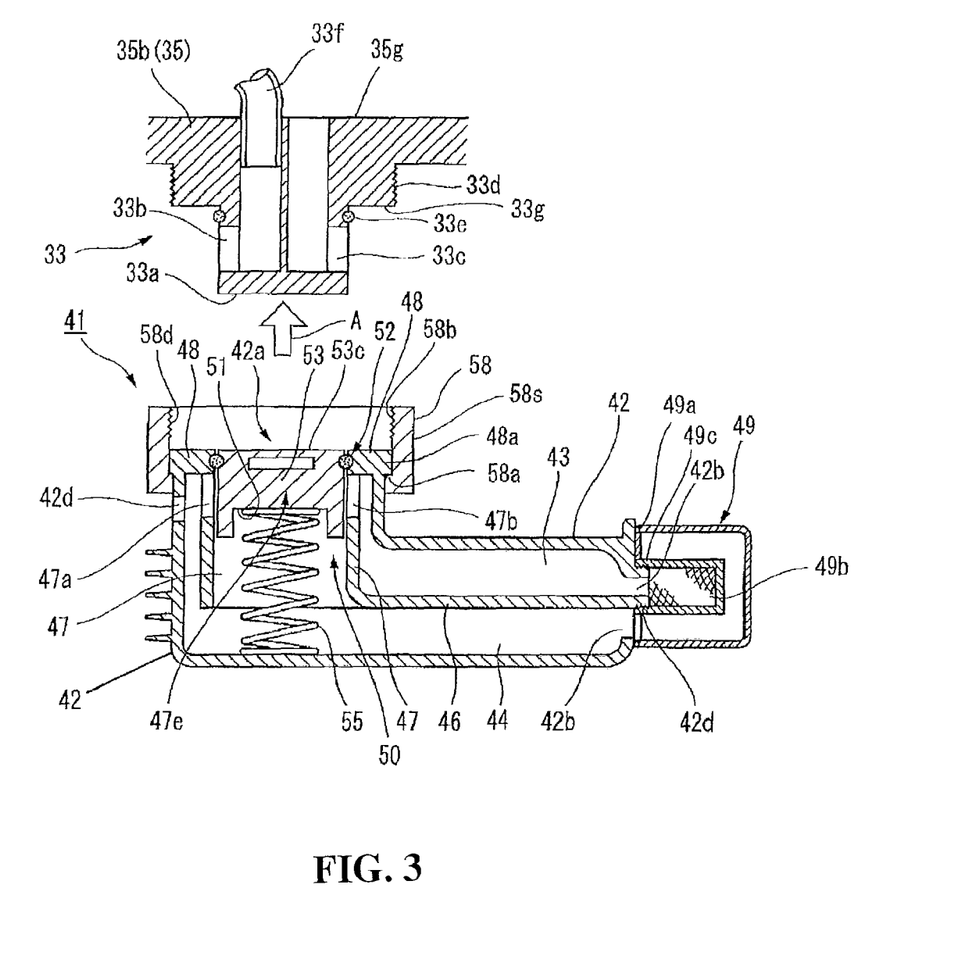
FIG. 3 is an enlarged sectional view of an oil storing device according to the first preferred embodiment before mounting the oil storing device to an engine and a mounting portion.
Figure 4:
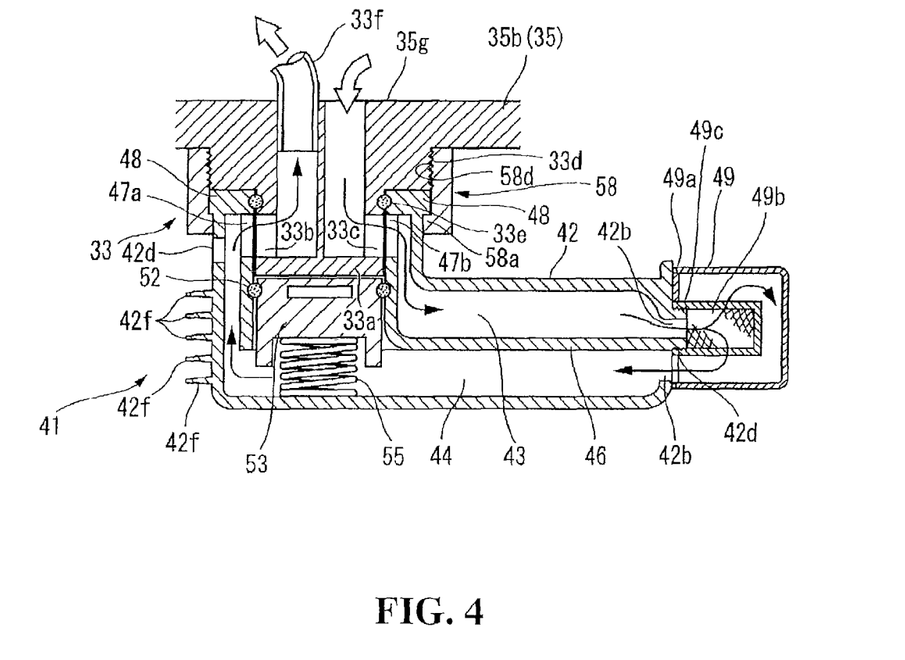
FIG. 4 is a view similar to FIG. 3, showing a mounted condition of the oil storing device to the engine.
Figure 7:
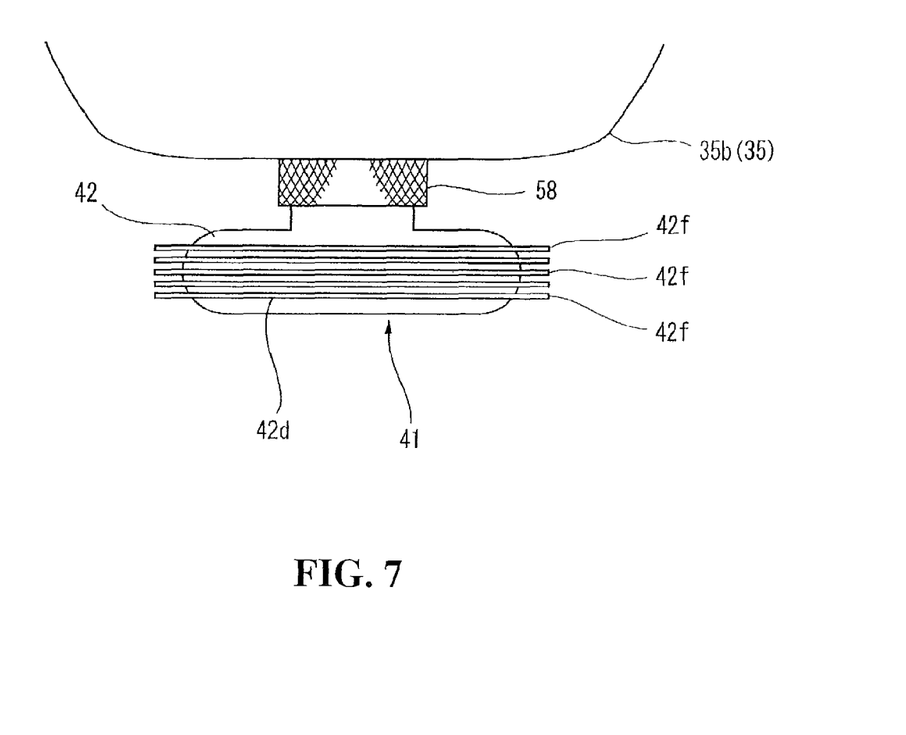
FIG. 7 is a front elevation of the oil storing device mounted on the engine in the first preferred embodiment as viewed from the front side of the motorcycle shown in FIG. 1.

As shown in FIGS. 1, 2, and 7, the oil storing device 41 has a flattened cylindrical shape such that a mounted portion of the oil storing device 41 to be mounted to the engine E (a portion to be fixed by a fastening member 58) is formed at one end of the oil storing device 41. As shown in FIGS. 3 and 4, the vertical sectional shape of the oil storing device 41 is a substantially L-shape. Thus, the oil storing device 41 has a flattened structure extending rearwardly along the lower surface of the engine E in such a manner that the amount of projection of the oil storing device 41 under the vehicle can be reduced and a necessary oil storage capacity can be ensured in the oil storing device 41. The oil storing device 41 has a substantially L-shaped body portion 42. The body portion 42 has an engaging portion 42a at one end adapted to be detachably connected to a connecting portion 33 of the crankcase 35 (the lower case half 35b). The engaging portion 42a is suitably fixed to the connecting portion 33 by using the fastening member 58 to be hereinafter described.

The internal structure of the oil storing device 41 is such that an oil supply port 47a for supplying engine oil to the engine E and an oil return port 47b for introducing the engine oil circulated in the engine E and returned to the oil storing device 41 are provided in opposed relation to each other so as to open into a communication hole 47e formed inside the engaging portion 42a. The oil supply port 47a is connected to a lower oil storing chamber 44, and the oil return port 47b is connected to an upper oil storing chamber 43. The upper oil storing chamber 43 and the lower oil storing chamber 44 are separated from each other by a separation wall 46. However, the upper and lower oil storing chambers 43 and 44 are connected to each other at the other end of the body portion 42. In the mounted condition where the oil storing device 41 is mounted on the engine E, the upper and lower oil storing chambers 43 and 44 cooperate with each other to store a proper amount of engine oil.

The body portion 42 of the oil storing device 41 is formed at its other end (right end as viewed in FIG. 3) with a pair of upper and lower opening portions 42b for respectively making the upper and lower oil storing chambers 43 and 44 open to the outside of the oil storing device 41. The upper opening portion 42b corresponding to the upper oil storing chamber 43 is formed with an externally threaded portion 42d for mounting an oil filter 49. Accordingly, the upper and lower oil storing chambers 43 and 44 are connected through the oil filter 49.

More specifically, the oil filter 49 is formed with an internally threaded portion 49c for engaging the externally threaded portion 42d of the upper opening portion 42b of the body portion 42. An O ring 49a is provided on one end of the outer cylindrical portion of the oil filter 49, so as to tightly seal the mount surface between the body portion 42 and the oil filter 49.

The engaging portion 42a of the oil storing device 41 is provided with closing means 50 for closing the oil supply port 47a and the oil return port 47b. A circular cylindrical wall portion 47 is formed so as to extend downwardly from the engaging portion 42a, thereby forming the communication hole 47e to which the oil supply port 47a and the oil return port 47b open. The closing means 50 includes a piston member 53 for closing the communication hole 47e formed in the circular cylindrical wall portion 47, a seal member 52 such as an O ring for sealing the outer circumference of the piston member 53, and a spring member 55 such as a coil spring for biasing the piston member 53 to a closed position of the communication hole 47e.

Accordingly, the oil storing chambers 43 and 44 can be tightly closed by the closing means 50 to thereby prevent entry of dust into the oil storing chambers 43 and 44. Further, engine oil can be preliminarily sealed in the oil storing chambers 43 and 44.

As described later, the piston member 53 is adapted to be pushed against the biasing force of the spring member 55, thereby opening the communication hole 47e.

Figure 5:
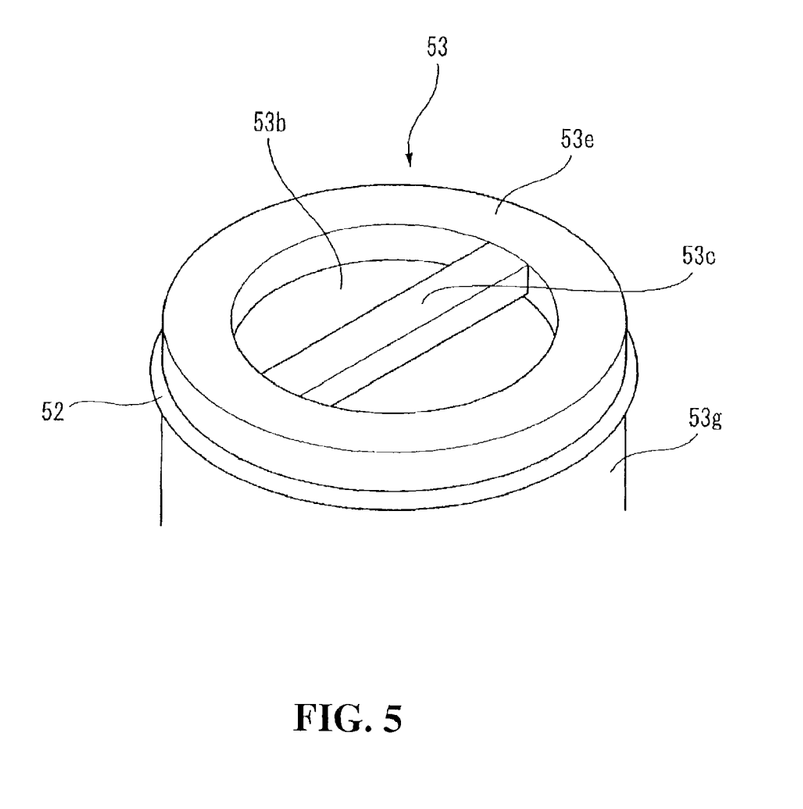
FIG. 5 is an enlarged perspective view of an upper end portion of a piston member in the oil storing device according to the first preferred embodiment.

As shown in FIG. 5, the piston member 53 is provided with a grip 53c for use in pulling the piston member 53 from the engaging portion 42a. The grip 53c has a bridge structure such that it spans the opposite inner circumferential portions of a recess 53b formed on an upper end surface 53e of the piston member 53. Accordingly, the piston member 53 can be easily removed from the engaging portion 42a by pinching the grip 53c with the operator's fingers or any suitable tool and then pulling the piston member 53.

Figure 6:
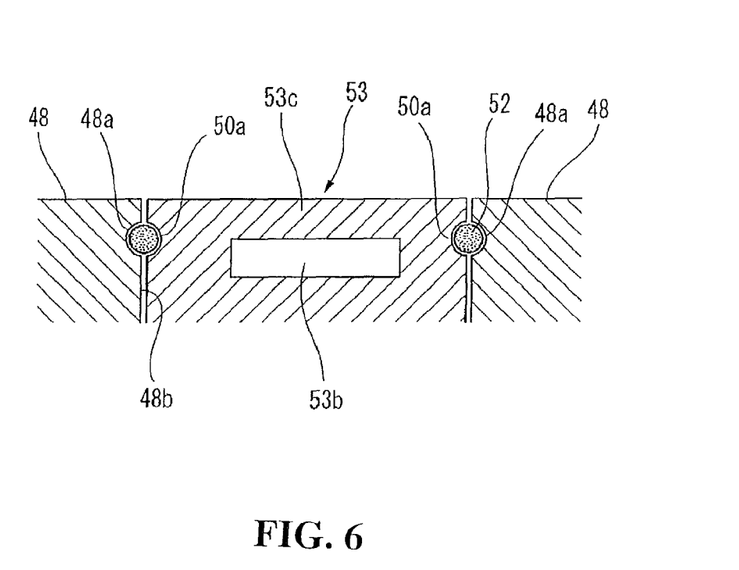
FIG. 6 is an enlarged sectional view of an essential part of the piston member and its peripheral member in the first preferred embodiment.

The seal member 52 is mounted on an outer circumferential surface 53g of the piston member 53. As shown in FIG. 6, the outer circumferential surface 53g of the piston member 53 is formed with an outer circumferential groove 50a having a semicircular cross section, and the inner half portion of the seal member 52 is fitted in the outer circumferential groove 50a of the piston member 53. On the other hand, the engaging portion 42a has an upper end portion 48 having an inner circumferential surface 48b constituting the communication hole 47e. The inner circumferential surface 48b of the upper end portion 48 of the engaging portion 42a is formed with an inner circumferential groove 48a having a semicircular cross section.

Thus, the seal member 52 is fitted in the inner circumferential groove 48a of the engaging portion 42a, thereby tightly closing the communication hole 47e.

In the case of recycling the oil storing device 41, the piston member 53 can be easily removed from the engaging portion 42a, so that the engine oil (waste oil) stored in the body portion 42 can be easily discarded.

The outer surface of the body portion 42 is formed with a plurality of cooling fins 42f extending horizontally on the front side of the body portion 42 and on the right and left sides of the body portion 42. More specifically, the cooling fins 42f horizontally extend in the lateral direction on the front side of the body portion 42 and horizontally extend in the longitudinal direction on the right and left sides of the body portion 42. Owing to the cooling fins 42f, heat radiation from the body portion 42 can be effectively performed to thereby cool the engine oil.

The body portion 42 is provided with an inspection window 42d formed of glass or the like at a position near the engaging portion 42a for the purpose of visual inspection of the inside of the body portion 42 from the front side of the vehicle. The inspection window 42d allows the operator to visually inspect the amount of oil stored in the oil storing chambers 43 and 44. More specifically, in the case of draining the engine oil from the engine E, the operator can determine at a glance whether or not the engine oil in the engine E has entirely fallen into the oil storing chamber 43 and 44, so that the operator can determine the timing of removal of the oil storing device 41 from the engine E.

An annular fastening member 58 is provided at one end of the body portion 42 so as to surround the engaging portion 42a. The inner circumferential surface of the upper end portion of the fastening member 58 is formed with an internally threaded portion 58b. The lower end portion of the fastening member 58 is formed as a jaw portion 58a reduced in inner diameter. Accordingly, the internally threaded portion 58b of the fastening member 58 is adapted to engage with the externally threaded portion 33d of the connecting portion 33 of the crankcase 35, and the jaw portion 58a of the fastening member 58 is adapted to abut against the flange 48a of the upper end portion 48. The fastening member 58 has a knurled outer circumferential surface 58s.

The connecting portion 33 of the crankcase 35 is formed at the lower portion of the crankcase 35. More specifically, as shown in FIG. 3, the connecting portion 33 is formed at the lowermost portion of the crankcase 35 so as to project downward therefrom. The connecting portion 33 has a two-step projection structure such that a large-diameter portion is formed at the base portion of the connecting portion 33 as the externally threaded portion 33d and a small-diameter portion 33a projecting from the lower end of the large-diameter portion 33d with a shoulder portion 33g is formed between the large-diameter portion 33d and the small-diameter portion 33a. The small-diameter portion 33a is formed with an inlet port 33b and an outlet port 33c. The inlet port 33b is connected to a pipe 33f connected to an oil pump, and the outlet port 33c is connected to a bottom surface 35g of the crankcase 35. Further, a seal member 33e such as an O ring is provided on the outer circumference of the base portion of the small-diameter portion 33a.

The mounting and demounting operation for the oil storing device 41 will now be described.

In mounting the oil storing device 41, the engaging portion 42a of the oil storing device 41 is set under the connecting portion 33 of the crankcase 35 so as to be aligned to each other as shown in FIG. 3. Thereafter, the engaging portion 42a is moved upwardly as shown by an arrow A in FIG. 3 until abutting against the small-diameter portion 33a. When the engaging portion 42a is further moved upwardly, the piston member 53 is pushed by the small-diameter portion 33a against the biasing force of the spring member 55, so that the small-diameter portion 33a is engaged into the engaging portion 42a as shown in FIG. 4. More specifically, the piston member 53 is replaced by the small-diameter portion 33a in the communication hole 47e. In the fully engaged condition of the small-diameter portion 33a, the seal member 33e mounted on the small-diameter portion 33a comes into fit with the inner circumferential groove 48a of the engaging portion 42a. Finally, the fastening member 58 is turned, thereby fixing the oil storing device 41 to the engine E as shown in FIG. 4.

In this mounted condition, the oil supply port 47a of the oil storing device 41 communicates with the inlet port 33b of the engine E, and the oil return port 47b of the oil storing device 41 communicates with the outlet port 33c of the engine E. Further, the seal member 33e of the connecting portion 33 of the engine E is fitted in the inner circumferential groove 48a of the engaging portion 42a of the oil storing device 41, thereby ensuring a sealed condition. In this manner, the oil storing device 41 can be mounted to the engine E by a simple operation. In this preferred embodiment, the oil filter 49 can also be changed at the same time.

In the case wherein engine oil is preliminarily sealed in the oil storing device 41, the oil change can also be completed by mounting this oil storing device 41. In this manner, when the oil storing device 41 is replaced by a new one, the oil change can be completed at the same time. Accordingly, no oil filler port is needed, so that the structure of the engine E can be simplified.

The operation of a lubricating oil supply mechanism using the oil storing device 41 mounted on the engine E will now be described.

When the engine E having the oil storing device 41 is driven, the engine oil stored in the oil storing device 41 is sucked through the oil supply port 47a and the inlet port 33b into the engine E. Thereafter, the engine oil is supplied through an oil passage to a transmission (e.g., main shaft, counter shaft, clutch mechanism, etc.) and also through a main gallery branched from an oil passage to the crankshaft, pistons, camshafts, etc. of the engine E.

After performing the lubricating operation, the engine oil is returned to the bottom surface 35g of the crankcase 35 and further returned through the outlet port 33c and the oil return port 47b into the upper oil storing chamber 43 of the oil storing device 41. Thereafter, any impurities contained in the returned engine oil are removed by a filter element 49b in the oil filter 49, and the engine oil is next sent to the lower oil storing chamber 44. Thereafter, the engine oil is supplied again from the oil storing device 41 to the engine E in a similar manner.

In the case of an oil change, the engine oil can be easily drained from the engine E because the oil storing chambers 43 and 44 as an oil reservoir are located at the lowermost position on the engine E. In demounting the oil storing device 41 for the purpose of oil change, the operator can determine whether or not the engine oil has entirely fallen into the oil storing device 41 by observing the inside of the oil storing device 41 through the inspection window 42d after the engine E is stopped and a given time has elapsed. After the engine oil has entirely fallen into the oil storing device 41, the fastening member 58 is loosened by the operator's fingers or the like and the engaging portion 42a is disengaged from the connecting portion 33. At the same time, the piston member 53 is pushed back by the biasing force of the spring member 55 to close the communication hole 47e. Accordingly, oil soiling such as oil spilling can be avoided in draining the oil, so that a clean oil draining operation can be performed. Thereafter, a new oil storing device 41 is mounted to the engine E as described above. In this manner, oil change can be made by simply replacing the oil storing device 41 by a new one.

Further, the oil storing device 41 can be recycled. More specifically, the piston member 53 can be removed and the oil filter 49 can also be removed. Accordingly, by removing the piston member 53 and the oil filter 49, the spent engine oil stored in the body portion 42 can be easily discarded and the oil storing device 41 can be reused.

A second preferred embodiment of the present invention will now be described with reference to FIG. 8.

Figure 8:
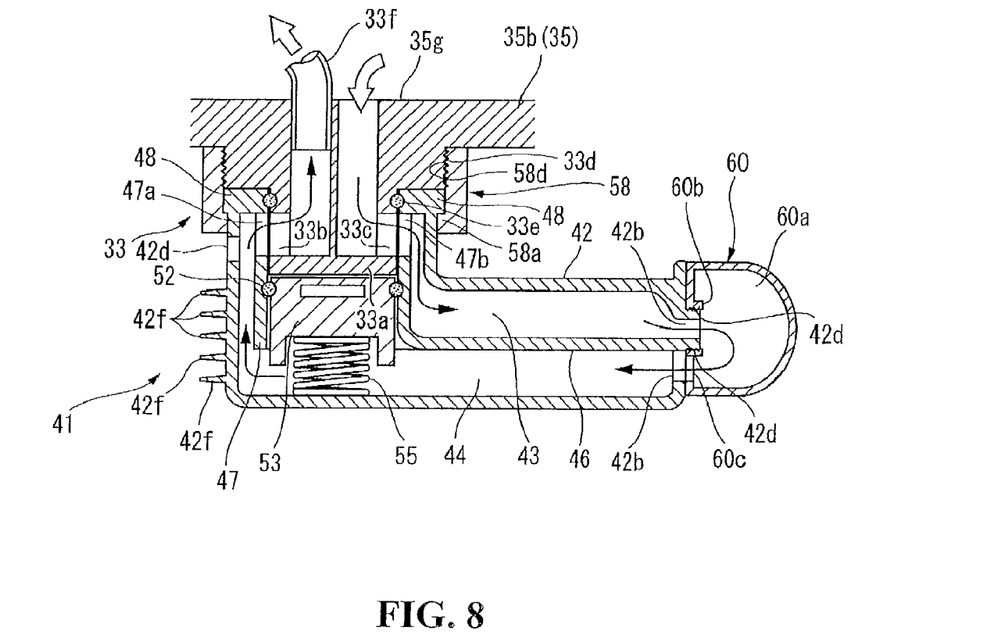
FIG. 8 is a view similar to FIG. 4, showing a second preferred embodiment of the present invention.

As shown in FIG. 8, a cap 60 is provided in place of the oil filter 49 shown in FIG. 4 and the other structure is the same as that of the first preferred embodiment. Accordingly, the same parts are denoted by the same reference symbols and the description thereof will be omitted herein.

In the second preferred embodiment, the cap 60 is mounted on the opening portions 42b of the body portion 42. More specifically, the cap 60 engages with the externally threaded portion 42d formed on the outer circumference of the upper opening portion 42b corresponding to the upper oil storing chamber 43 communicating with the oil return port 47b. Further, the cap 60 has an opening 60c communicating with the lower opening portion 42b corresponding to the lower oil storing chamber 44. Accordingly, the cap 60 functions to connect the upper and lower oil storing chambers 43 and 44, and the inside space 60a of the cap 60 functions as an oil storing chamber.

According to the oil storing device 41 shown in FIG. 8, the cap 60 can be replaced by the oil filter 49 used in the first preferred embodiment. Accordingly, the body portion 42 has a compatible structure for both the cap 60 and the oil filter 49.

The cap 60 is detachably connected to the body portion 42. This structure is convenient in recycling the oil storing device 41 after it is demounted from the engine E. More specifically, after demounting the oil storing device 41 from the engine E, the cap 60 can be removed and the piston member 53 can also be removed. Accordingly, the spent engine oil stored in the oil storing chambers 43 and 44 can be easily discarded, and the inside of the body portion 42 can be easily cleaned.

A third preferred embodiment of the present invention will now be described with reference to FIGS. 9 and 10.

Figure 9:
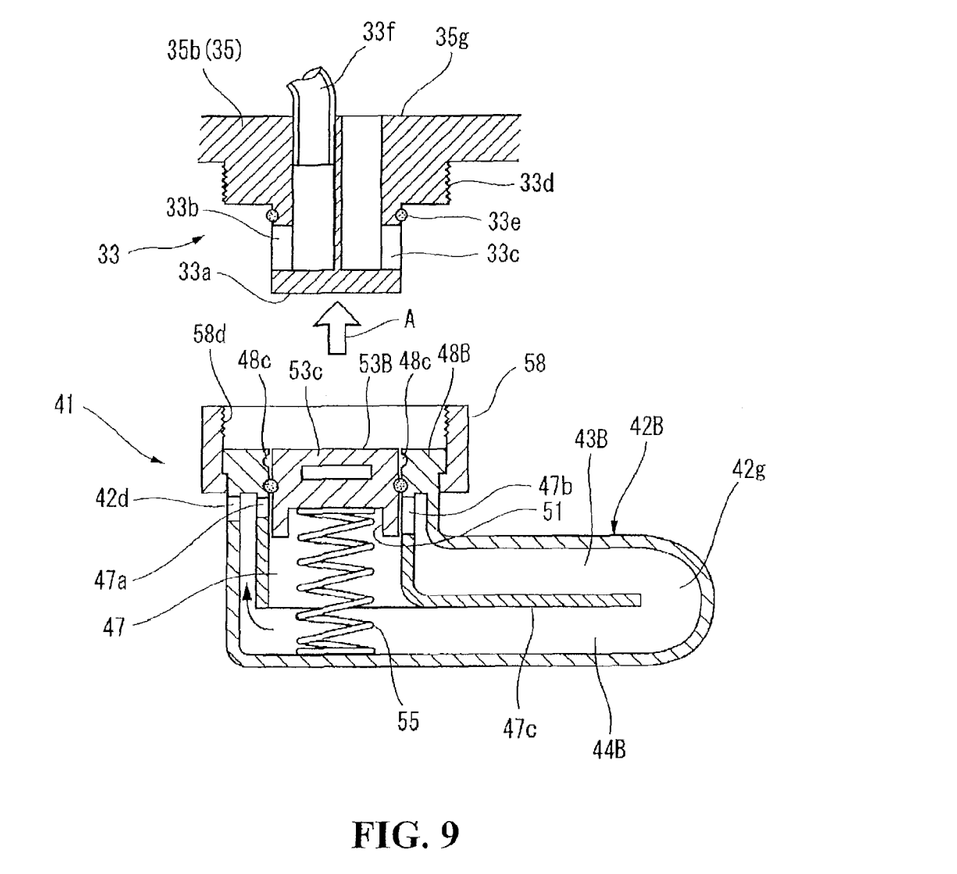
FIG. 9 is a view similar to FIG. 3, showing a third preferred embodiment of the present invention.
Figure 10:
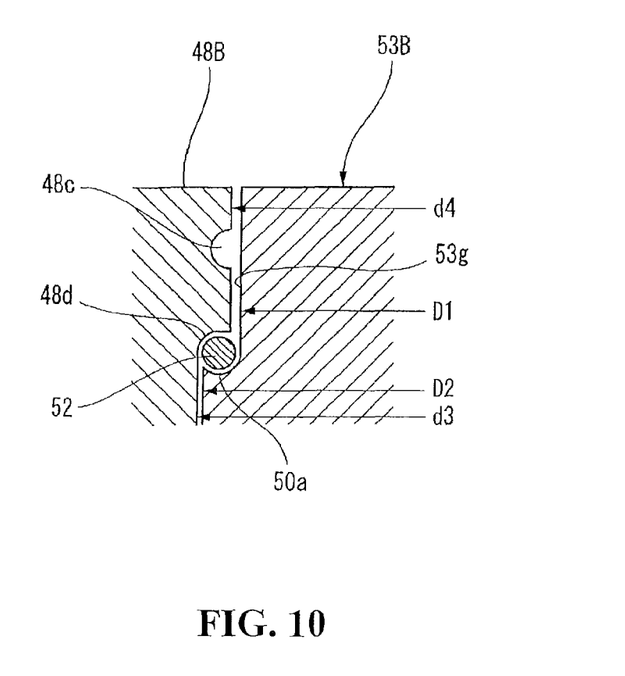
FIG. 10 is an enlarged sectional view showing a sealing structure for a piston member and its peripheral member in the third preferred embodiment shown in FIG. 9.

As shown in FIGS. 9 and 10, the third preferred embodiment is different from the first and second preferred embodiments in the structure of a body portion 42B and the structure of a piston member 53B. The other configuration is the same as that of the first and second preferred embodiments, so the same parts are denoted by the same reference symbols and the description thereof will be omitted herein.

In the oil storing device 41 according to the third preferred embodiment, the body portion 42B is not formed with the opening portions 42b shown in FIGS. 4 and 8, but the other end (right end as viewed in FIG. 9) of the body portion 42B is closed. The body portion 42B is provided with a separation wall 47c. These upper and lower oil storing chambers 43B and 44B communicate with each other through a communication passage 42g formed through the separation wall 47c. Accordingly, the engine oil returned from the engine E to the oil storing device 41 flows from the oil return port 47b through the upper oil storing chamber 43B, the communication passage 42g, and the lower oil storing chamber 44B to the oil supply port 47a.

As shown in FIG. 10 which is an enlarged sectional view of an essential part of the piston member 53B, a structure for retaining the seal member 52 is different from that of the first and second preferred embodiments. The seal member 52 is retained along the outer circumferential surface 53g of the piston member 53B. The piston member 53B is composed of an upper small-diameter portion having a diameter D1 and a lower large-diameter portion having a diameter D2 larger than the diameter D1. The outer circumferential groove 50a is formed between the upper small-diameter portion and the lower large-diameter portion. On the other hand, the inner circumferential surface 48b of the mounted portion 48B of the body portion 42B is formed with an inner circumferential groove 48d facing the seal member 52. The mounted portion 48B has an upper portion having an inner diameter d4 and a lower portion having an inner diameter d3 larger than the inner diameter d4. The inner circumferential groove 48d is formed between the upper portion and the lower portion. Accordingly, the seal member 52 retained in the outer circumferential groove 50a and the inner circumferential groove 48d is compressed in the vertical direction by the biasing force of the spring member 55, so that the sealing performance for the piston member 53B can be more ensured.

In mounting the oil storing device 41 according to the third preferred embodiment to the engine E, the piston member 53B is pushed by the connecting portion 33 of the engine E. At this time, the seal member 52 retained in the outer circumferential groove 50a can be smoothly disengaged from the inner circumferential groove 48d, so that the piston member 53B can be easily moved inward of the body portion 42B. Accordingly, the oil storing device 41 can be easily mounted to the engine E. Further, in the mounted condition of the oil storing device 41 to the engine E, the seal member 33e mounted on the connecting portion 33 of the engine E is fitted in another inner circumferential groove 48c of the upper portion of the mounted portion 48B.

Having thus described the first, second, and third preferred embodiments of the present invention, the present invention is not limited to these preferred embodiments, but various modifications may be made. For example, the shape of the body portion, the engaging structure of the engaging portion, and the sealing structure are not especially limited, but may be modified as required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil storing device having a body portion, comprising:
   an engaging portion formed at one end of the body portion of the oil storage device,
   said engaging portion having an oil supply port for supplying engine oil to an engine and an oil return port for introducing the engine oil from said engine, said engaging portion of the body portion of the oil storing device being adapted to be detachably connected to a connecting portion of a crankcase; and
   an oil storing chamber of the oil storage device for storing the engine oil, said oil storing chamber being formed in said body portion so as to be connected to said oil supply port and said oil return port;
   wherein when said engaging portion of the body portion of the oil storage device is engaged with said connecting portion of said crankcase,
   said oil supply port of the engaging portion is connected to an inlet port of the connecting portion of the crankcase leading to an oil pump, and
   said oil return port of the engaging portion is connected to an outlet port of the connecting portion of the crankcase allowing the engine oil to flow from the crankcase;
   wherein said engaging portion of the oil storage device is provided with closing means for closing said oil supply port and said oil return port of the oil storage device, so said oil storing chamber of the oil storage device is able to be enclosed; wherein the engaging portion of the body portion of the oil storage device includes: a communication hole to which said oil supply port and said oil return port open, and said closing means of the engaging portion comprises: a piston member for closing the communication hole, a seal member for sealing an outer circumference of said piston member, and a spring member for biasing said piston member to a closed position of said communication hole; and when said piston member is pushed against a biasing force of said spring member, said communication hole of the body portion of the oil storing device is opened.

2. The oil storing device according to claim 1, wherein engine oil is preliminarily sealed in said oil storing chamber of the oil storage device.

3. The oil storing device according to claim 1, wherein said piston member is provided with a grip for use in pulling said piston member out of said engaging portion of the body portion of the oil storage device.

4. The oil storing device according to claim 1, wherein said oil storing chamber of the oil storage device is formed with an opening portion adapted to communicate with the outside of said oil storing chamber.

5. The oil storing device according to claim 4, further comprising:
   an oil filter mounted on said opening portion of the body portion for communicating with said oil storing chamber of the oil storage device.

6. The oil storing device according to claim 4, further comprising:
   a cap mounted on said opening portion of the body portion so as to communicate with said oil storing chamber of the oil storage device.

7. The oil storing device according to claim 1, further comprising:
   a cooling fin formed on the outer surface of said body portion of the oil storage device.

8. The oil storing device according to claim 1, further comprising:
   an inspection window is formed provided said body portion of the oil storing device in order to provide for visual inspection of an oil level in said body portion of the oil storing device.

9. The oil storing device according to claim 1, further comprising:
   a fastening member provided at one end of said body portion of the oil storing device for maintaining an engaged condition of said connecting portion of the crankcase and said engaging portion of said body portion of the oil storing device.

10. An engine having said oil storing device according to claim 1.

11. The engine according to claim 10, wherein said connecting portion of the crankcase is provided at a lower portion of said crankcase, and is provided with an inlet port and an outlet port,
    wherein said oil supply port of the engaging portion of said body portion of the oil storage device is arranged to communicate directly with said inlet port of the connecting portion of the crankcase, and said oil return port of the engaging portion is arranged to communicate directly with communicate with said outlet port of the connecting portion of the crankcase.

12. The engine according to claim 11, wherein said connecting portion of the crankcase projects downwardly from a lowermost portion of said crankcase, and
said oil storing device is mounted on said crankcase,
wherein said oil storing chamber of the oil storing device is located below said crankcase.

13. The engine according to claim 11, wherein when said engaging portion of the body portion of the oil storage device is engaged with said connecting portion of the crankcase,
said piston member is pushed into said oil storing device by said connecting portion against the biasing force of said spring member, so that said oil supply port of the oil storing device is connected to said inlet port of the crankcase leading to the oil pump, and
said oil return port of the oil storing device is connected to said outlet port of the crankcase allowing the engine oil to flow from the crankcase.

14. An oil storing device, comprising:
a body portion of the oil storing device including:
an engaging portion formed at one end of the body portion, said engaging portion having an oil supply port adapted to supply engine oil and an oil return port adapted to introduce engine oil, said engaging portion of the body portion of the oil storing device being adapted to be detachably connected to a connecting portion of a crankcase; and
an oil storing chamber of the oil storing device being adapted for storing engine oil, said oil storing chamber being formed in said body portion and being adapted to be connected to said oil supply port and said oil return port;
wherein when said engaging portion of the body portion is adapted to be engaged with said connecting portion of said crankcase,
said oil supply port of the engaging portion is adapted to be connected to an inlet port of the connecting portion leading to the oil pump, and
said oil return port of the engaging portion is adapted to be connected to an outlet port of the connecting portion allowing the en me oil to flow from the crankcase,
wherein the engaging portion of the body portion of the oil storing device includes:
a communication hole to which said oil supply port and said oil return port open, and closing means,
said closing means of the engaging portion comprises:
a piston member for closing the communication hole,
a seal member for sealing an outer circumference of said piston member, and
a spring member for biasing said piston member to a closed position of said communication hole; and
when said piston member is pushed against a biasing force of said spring member, said communication hole of the body portion of the oil storing device is opened.

15. The oil storing device according to claim 14, wherein said piston member of the closing means is provided with a grip for use in pulling said piston member out of said engaging portion of the body portion of the oil storage device.

* * * * *